United States Patent
Benisty et al.

(10) Patent No.: US 10,466,903 B2
(45) Date of Patent: Nov. 5, 2019

(54) SYSTEM AND METHOD FOR DYNAMIC AND ADAPTIVE INTERRUPT COALESCING

(71) Applicant: Western Digital Technologies, Inc., Irvine, CA (US)

(72) Inventors: Shay Benisty, Beer Sheva (IL); Eran Erez, Bothell, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 110 days.

(21) Appl. No.: 15/468,620

(22) Filed: Mar. 24, 2017

(65) Prior Publication Data

US 2018/0275872 A1    Sep. 27, 2018

(51) Int. Cl.
*G06F 3/06* (2006.01)
*G06F 13/24* (2006.01)

(52) U.S. Cl.
CPC .......... *G06F 3/061* (2013.01); *G06F 3/0659* (2013.01); *G06F 3/0679* (2013.01); *G06F 3/0688* (2013.01); *G06F 13/24* (2013.01); *G06F 2213/2406* (2013.01)

(58) Field of Classification Search
CPC . G06F 13/24; G06F 3/0659; G06F 2213/2406
See application file for complete search history.

(56) References Cited

U.S. PATENT DOCUMENTS

| | | | |
|---|---|---|---|
| 6,065,089 A * | 5/2000 | Hickerson | G06F 9/4825 710/266 |
| 6,654,343 B1 | 11/2003 | Brandis | |
| 7,386,674 B1 | 6/2008 | Lango | |
| 8,554,968 B1 | 10/2013 | Onufryk | |
| 8,732,406 B1 | 5/2014 | Pase | |
| 9,317,204 B2 | 4/2016 | Hahn | |
| 9,817,761 B2 | 11/2017 | Ben-Shemesh | |
| 9,927,983 B2 | 3/2018 | Benisty | |
| 10,095,442 B2 | 10/2018 | Myouga | |

(Continued)

FOREIGN PATENT DOCUMENTS

EP    2312457 A2    4/2011

OTHER PUBLICATIONS

Specification and Drawings of U.S. Appl. No. 15/457,676 entitled "Storage System and Method for Thermal Throttling via Command Arbitration" filed Mar. 13, 2017; 32 pages.

(Continued)

*Primary Examiner* — Zachary K Huson
(74) *Attorney, Agent, or Firm* — Brinks Gilson & Lione

(57) ABSTRACT

Systems and methods for dynamic and adaptive interrupt coalescing are disclosed. NVM Express (NVMe) implements a paired submission queue and completion queue mechanism, with host software on the host device placing commands into the submission queue. The memory device notifies the host device, via an interrupt, of entries on the completion queue. However, excessive interrupts become a burden to the host device. In that regard, the memory device includes a dynamic and adaptive interrupt coalescing methodology according to one or more parameters including: the completion queue; the commands; the queue depth; latency; and memory device firmware settings. In this way, the memory device may reduce the number of interrupts while still notifying the host device in a timely manner.

17 Claims, 13 Drawing Sheets

(56) References Cited

U.S. PATENT DOCUMENTS

| | | |
|---|---|---|
| 2003/0204552 A1 | 10/2003 | Zuberi |
| 2004/0199732 A1 | 10/2004 | Kelley |
| 2005/0195635 A1 | 9/2005 | Conley et al. |
| 2006/0161733 A1 | 7/2006 | Beckett et al. |
| 2008/0109573 A1 | 5/2008 | Leonard |
| 2012/0151472 A1 | 6/2012 | Koch et al. |
| 2014/0181323 A1 | 6/2014 | Manula |
| 2014/0189212 A1* | 7/2014 | Slaight .............. G06F 12/0866 711/103 |
| 2014/0281040 A1 | 9/2014 | Liu |
| 2015/0019798 A1 | 1/2015 | Huang |
| 2015/0067291 A1 | 3/2015 | Miyamoto |
| 2015/0074338 A1 | 3/2015 | Raviv et al. |
| 2015/0074677 A1* | 3/2015 | Pream .................. G06F 9/5083 718/104 |
| 2015/0081933 A1 | 3/2015 | Vucinic et al. |
| 2015/0127882 A1 | 5/2015 | Carlson et al. |
| 2015/0177994 A1 | 6/2015 | Vucinic |
| 2015/0178017 A1 | 6/2015 | Darrington |
| 2015/0186068 A1 | 7/2015 | Benisty |
| 2015/0186074 A1 | 7/2015 | Benisty |
| 2015/0254088 A1 | 9/2015 | Chou et al. |
| 2015/0363229 A1 | 12/2015 | Wang |
| 2016/0004438 A1 | 1/2016 | Moon et al. |
| 2016/0026388 A1 | 1/2016 | Jeong et al. |
| 2016/0062669 A1 | 3/2016 | Chu |
| 2016/0077740 A1 | 3/2016 | Hussain et al. |
| 2016/0085718 A1 | 3/2016 | Huang |
| 2016/0124876 A1 | 5/2016 | Vucinic |
| 2016/0140041 A1 | 5/2016 | Niu et al. |
| 2016/0147442 A1 | 5/2016 | Baderdinni et al. |
| 2016/0162219 A1 | 6/2016 | Erez |
| 2016/0188510 A1 | 6/2016 | Singh et al. |
| 2016/0216905 A1 | 7/2016 | Yazdani et al. |
| 2016/0239939 A1 | 8/2016 | Kakarlapudi |
| 2016/0267016 A1 | 9/2016 | Lee et al. |
| 2016/0291866 A1 | 10/2016 | Olkay |
| 2016/0292007 A1 | 10/2016 | Ding et al. |
| 2016/0321010 A1 | 11/2016 | Hashimoto |
| 2016/0321012 A1 | 11/2016 | Clark et al. |
| 2016/0342545 A1 | 11/2016 | Arai |
| 2017/0010992 A1* | 1/2017 | Sarcone ................. G06F 13/26 |
| 2017/0060422 A1 | 3/2017 | Sharifie et al. |
| 2017/0060749 A1 | 3/2017 | Segev et al. |
| 2017/0075629 A1 | 3/2017 | Manohar et al. |
| 2017/0075828 A1 | 3/2017 | Monji et al. |
| 2017/0083252 A1 | 3/2017 | Singh et al. |
| 2017/0090753 A1 | 3/2017 | Benisty |
| 2017/0109096 A1 | 4/2017 | Jean |
| 2017/0123659 A1 | 5/2017 | Nam et al. |
| 2017/0123667 A1 | 5/2017 | Richter |
| 2017/0131917 A1 | 5/2017 | Yun |
| 2017/0177222 A1 | 6/2017 | Singh et al. |
| 2017/0214762 A1 | 7/2017 | Swain |
| 2017/0286205 A1 | 10/2017 | Jeong |
| 2017/0322897 A1 | 11/2017 | Benisty |
| 2018/0059987 A1 | 3/2018 | Nimmagadda |
| 2018/0095911 A1 | 4/2018 | Ballapuram |
| 2018/0113615 A1 | 4/2018 | Park |
| 2018/0173461 A1 | 6/2018 | Carroll |
| 2018/0217951 A1 | 8/2018 | Benisty |
| 2018/0260152 A1 | 9/2018 | Bar |
| 2018/0275872 A1 | 9/2018 | Benisty |
| 2018/0275921 A1 | 9/2018 | Katagiri |
| 2018/0285073 A1 | 10/2018 | Fukuchi |
| 2018/0321844 A1 | 11/2018 | Benisty |
| 2019/0018805 A1 | 1/2019 | Benisty |

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.

Kevin Marks, Dell, Inc., "An NVM Express Tutorial", Flash Memory Summit 2013, Santa Clara, CA, 92 pages.

Unpublished U.S. Appl. No. 15/148,409 entitled "Systems and Methods for Processing a Submission Queue" filed May 6, 2016, pending, 45 pages.

Office Action in U.S. Appl. No. 15/651,544, dated Oct. 17, 2018, 13 pages.

Office Action in U.S. Appl. No. 15/613,795, dated Apr. 3, 2019, 11 pages.

Office Action in U.S. Appl. No. 15/602,874, dated Jan. 28, 2019, 19 pages.

Advisory Action Office Action in U.S. Appl. No. 15/585,827, dated Apr. 10, 2019, 4 pages.

Office Action in U.S. Appl. No. 15/585,827, dated Jun. 26, 2018, 36 pages.

Office Action in U.S. Appl. No. 15/585,827, dated Dec. 19, 2018, 31 pages.

Office Action in U.S. Appl. No. 15/585,753, dated Nov. 23, 2018, 11 pages.

Office Action in U.S. Appl. No. 15/585,717, dated Jun. 26, 2018, 10 pages.

Office Action in U.S. Appl. No. 15/585,717, dated Mar. 18, 2019, 13 pages.

Office Action in U.S. Appl. No. 15/497,547, dated Jan. 4, 2019, 23 pages.

"NVM Express TM: Unlock the Potential," compilation of several articles from Forum A-11, 2014 Flash Memory Summit, Aug. 4-7, 2014, Santa Clara, CA, 91 pages.

International Search Report and Written Opinion for Application No. PCT/US2018/019930 dated Jun. 4, 2018, 16 pages.

International Search Report and Written Opinion in Application No. PCT/US2018/019933 dated May 22, 2018, 12 pages.

NVMe Express Workgroup: "NVM Express 1.2", dated Nov. 3, 2014, obtained from the Internet on Aug. 9, 2018 from URL: <http://nvmexpress.org/wp-content/uploads/NVM_Express_1_2_Gold_20141209.pdf>, 205 pages.

International Search Report and Written Opinion in Application No. PCT/US2018/019905 dated May 4, 2018, 13 pages.

International Search Report and Written Opinion in Application No. PCT/US2018/019941 dated Jul. 13, 2018, 18 pages.

International Search Report and Written Opinion in Application No. PCT/US2018/019914 dated Jul. 13, 2018, 18 pages.

International Search Report and Written Opinion in Application No. PCT/US2018/019909 dated Jul. 6, 2018, 18 pages.

International Search Report and Written Opinion in Application No. PCT/US2018/019911 dated May 28, 2018, 15 pages.

* cited by examiner

SYSTEM AND METHOD FOR DYNAMIC AND ADAPTIVE INTERRUPT COALESCING

BACKGROUND

NVM Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, with host software on the host device placing commands into the submission queue. Completions are placed onto the associated completion queue by the memory device controller.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
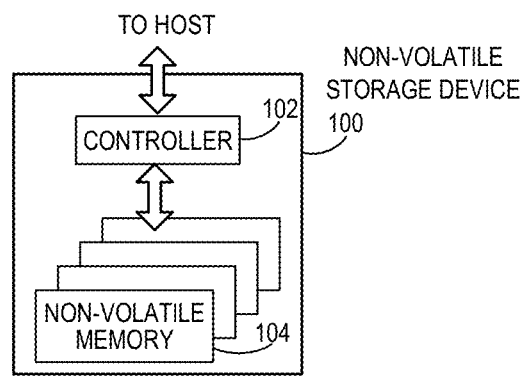
FIG. 1A is a block diagram of an exemplary non-volatile memory system.

A common bottleneck for high-speed data transfers is the high rate of interrupts that the receiving system has to process. These interrupts consume signaling resources on the receiving system's bus(es), and introduce significant CPU overhead as the receiving system transitions back and forth between "productive" work and interrupt handling (which may be many thousands of times a second). To alleviate this load, the NVMe standard includes two parameters for interrupt coalescence. In particular, the NVMe standard defines the TIME and THR parameters that can be configured by the host device at the initialization phase, as shown in the following:

| Bit | Description |
|---|---|
| 31:16 | Reserved |
| 15:08 | Aggregation Time (TIME): Specifies the recommended maximum time in 100 microsecond increments that a controller may delay an interrupt due to interrupt coalescing. A value of 0 h corresponds to no delay. The controller may apply this time per interrupt vector or across all interrupt vectors. The reset value of this setting is 0 h. |
| 07:00 | Aggregation Threshold (THR): Specifies the recommended minimum number of completion queue entries to aggregate per interrupt vector before signaling an interrupt to the host. This is a 0's based value. The reset value of this setting is 0 h. |

The two parameters listed above are global for all supported interrupt vectors. Thus, when the feature is enabled, the memory device sends the interrupt in two scenarios:

THR completion entries were posted to the relevant completion queue; and

TIME was elapsed since the aggregation of the very first interrupt.

Under these two parameters, when multiple command completions are received in a short timeframe, the memory device controller coalesces the messages and interrupts the host device only once. Conversely, in implementing interrupt coalescence, the memory device that has completed a command does not send an interrupt to the host device immediately, but waits for a little while in case more command completions are posted. In practice, these two parameters result in a static interrupt coalescing methodology. Consequently, using these two parameters can have a negative impact on latency, with a trade-off between latency and load reduction.

In one implementation, the memory device uses a dynamic and adaptive interrupt coalescing methodology that supports multiple platforms according to one or more parameters. The one or more parameters may include any one, any combination, or all of the following:

(i) one or more aspects of the completion queue (e.g., Completion Queue ID (which may be indicative of a priority, such as a relative priority, of a particular completion queue), the completion queue status (e.g., measure of fullness, such as whether the completion queue is full, almost empty, or in between), etc.);

(ii) one or more aspects of the command(s) (e.g., command classification, outstanding commands in the memory device (e.g., the stage of execution of the outstanding commands), etc.);

(iii) queue depth (number of commands in process, such as in between the sequential queue doorbell and the completion queue posting);

(iv) latency (e.g., host latency (e.g., the time passed between the memory device posting the interrupt and the host device, responsive to receiving the interrupt, fetching entries from the completion queue), feedback from past decisions (the logic may be adaptive based on past decisions and latency results), etc.); and (v) memory device firmware settings (e.g., memory device internal thresholds, watermark levels, etc.).

With regard to (i), certain completion queues may alter interrupt scheduling. In particular, Admin Completion Queue (which may be considered the highest priority) and high priority I/O completion queues (which may be considered the second highest priority) may alter the interrupt scheduling such as reducing the aggregation threshold to a lower level or even posting the interrupt immediately. The memory device may use a counter that counts the number of entries that the memory device has posted to the completion queue in determining when to issue the interrupt. As discussed in more detail below, due to host latency in responding to the interrupt and due to the memory device posting additional entries to the completion queue during the host latency period, the memory device may dynamically update the value of the counter to reflect that the additional entries posted have been processed by the host device.

With regard to (ii), one or more aspects of the commands may alter interrupt scheduling. For example, certain types of commands may be deemed urgent and may thus alter the interrupt scheduling, such as reducing the aggregation threshold to a lower level or even posting the interrupt immediately. In one implementation, the memory device may determine a type of command, and based on the determined type, designate the interrupt as urgent. For example, the memory device may treat read commands as urgent since the host device is "waiting" for the read commands to be completed. As another example, the memory device may treat a FUA (forced unit access) command as another type of command whose interrupt may be treated urgently (e.g., reducing the aggregation threshold to a lower level or even posting the interrupt immediately). In another implementation, the memory device may analyze other aspects of the commands, such as the LBA range, and may revise interrupt scheduling accordingly. In particular, the memory device may detect a specific LBA range as an operating system log update, and in response thereto, treat the interrupt as urgent. In still another implementation, the memory device may analyze execution of the command as it affects interrupt scheduling. In particular, as discussed in more detail below, a command undergoes various phases. The memory device may analyze the phases of for various commands (e.g., deeply queued, error correction, sense or transfer from Flash) and estimate a time for completions of the various commands. In turn, the memory device may use the estimated time for completions in deciding when to schedule interrupts to the host device and whether to coalesce the interrupts, as discussed in more detail below.

With regard to (iv), the memory device may determine host latency in one of several ways. In one way, the memory device may estimate host latency based on previous communication transfers (e.g., from the time of the memory device interrupt to the time the host device notifies that the completion queue entry has been reviewed). In another way, the memory device may determine host latency as a function of queue depth. The memory device may use information on host latency in order to post the interrupt before the memory device updates the completion queue. For example, the memory device may post an interrupt with the expectation that, after factoring in host latency, the host device will review a certain number of new entries on the completion queue.

With regard to (v), the memory device has various firmware settings, such as memory device internal thresholds, watermark levels, or the like, that may affect interrupt coalescing, as discussed in more detail below.

In this regard, the interrupt coalescing methodology may use one or more parameters: based on an internal aspect of the memory device; based on a dynamic aspect (e.g., after the initialization phase); based on the sequential queue (e.g., based on the priority of the sequential queue); and/or based on the completion queue (e.g., based on the priority of the completion queue). As discussed in more detail below, the interrupt coalescing methodology may be applied to various scenarios. For instance, the interrupt coalescing methodology may adapt to different requirements for NVMe systems, such as low queue depth for a first NVMe system and high queue depth for a second NVMe system.

EMBODIMENTS

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
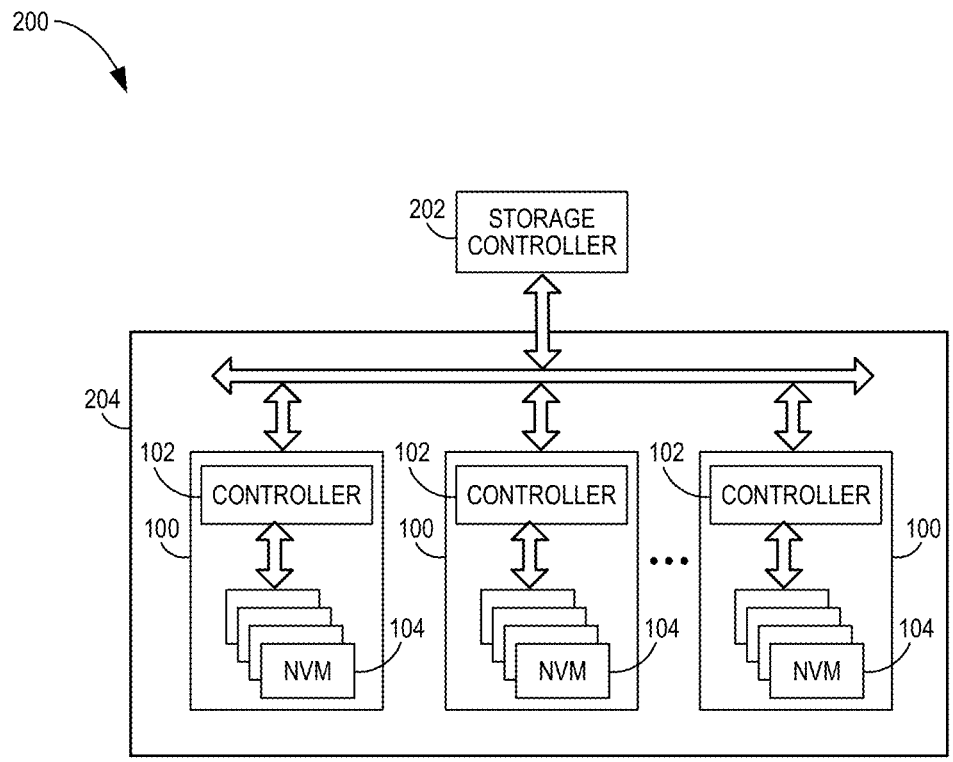
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
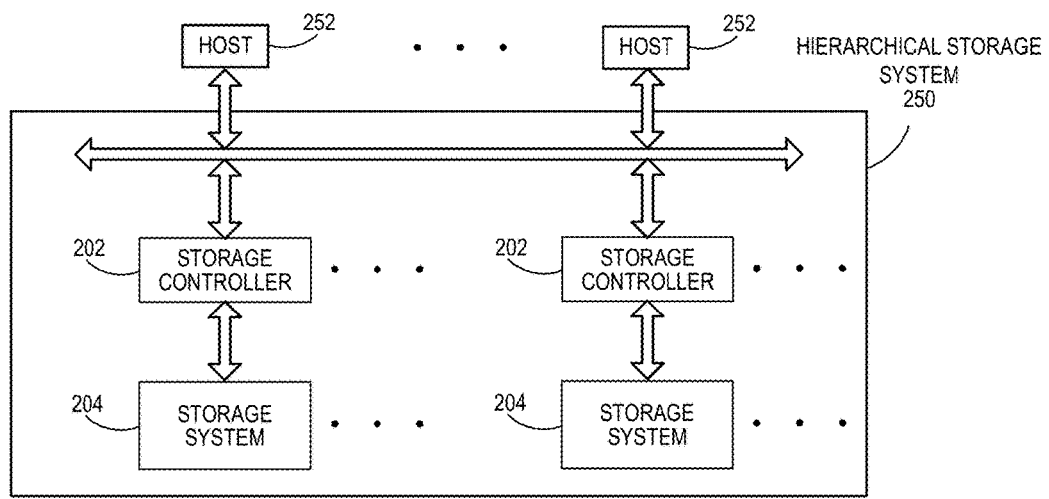
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
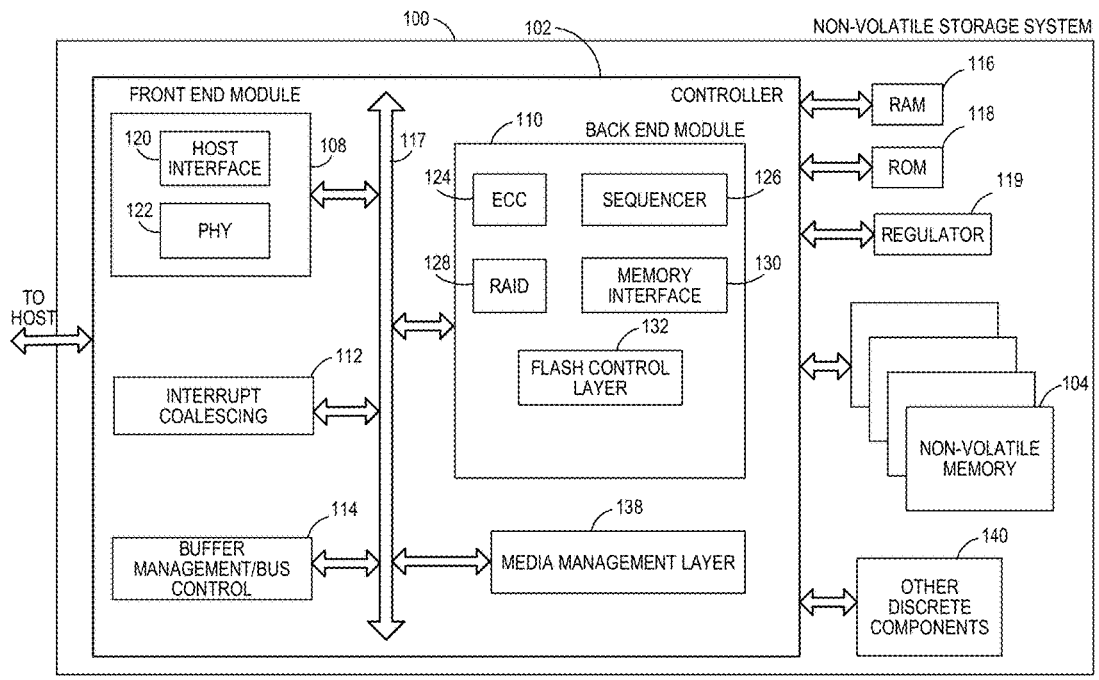
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32 G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Another module of the non-volatile memory device 100 illustrated in FIG. 2A may include interrupt coalescing module 112. As discussed in more detail below, the memory device may determine whether to coalesce interrupts to the host device, with the memory device using the interrupt coalescing module 112 to make the determination.

Figure 2B:
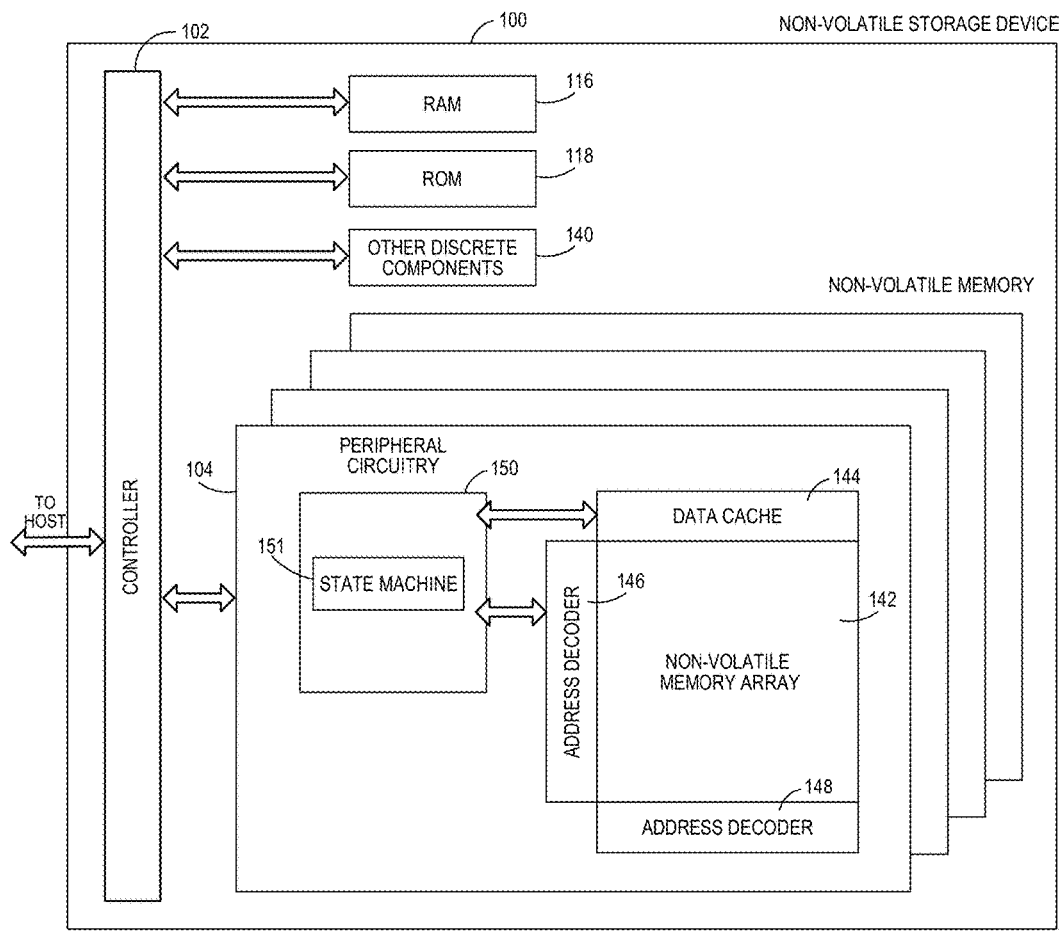
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
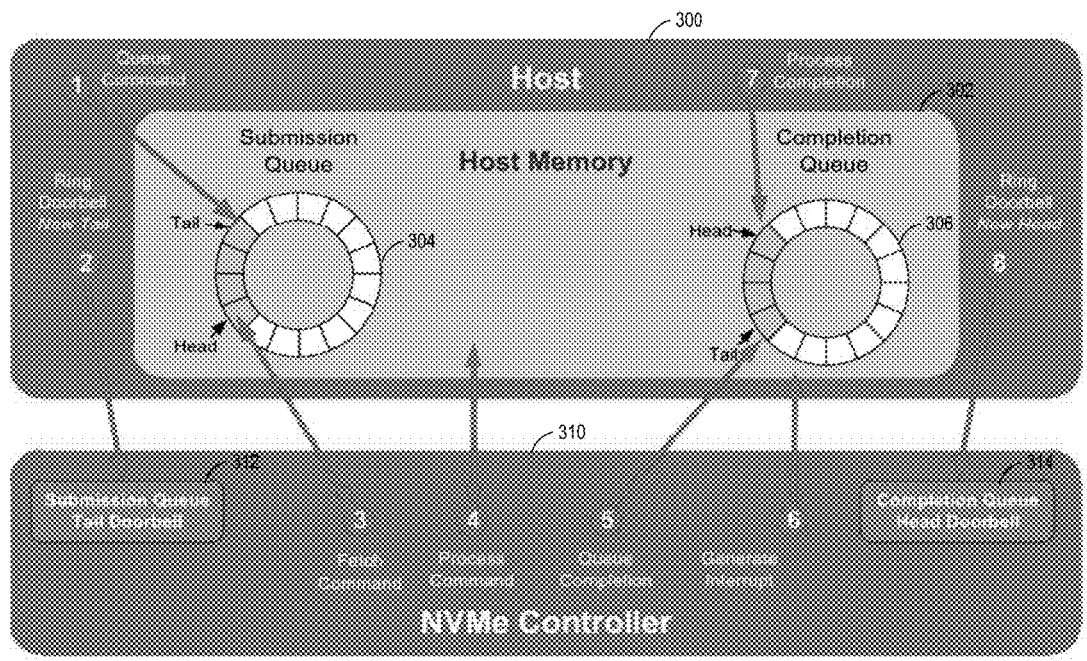
FIG. 3 is a block diagram of the host device and NVMe controller illustrating a sequence for a host device and a memory device to request and process an NVMe command.

FIG. 3 illustrates a sequence of steps for executing a command via the NVMe standard. As shown, the host device 300 includes host memory 302, and the memory device includes a controller, such as an NVMe controller 310. In one implementation, the host memory 302 includes a submission queue 304 and a completion queue 306. Further, in one implementation, the submission queues and completion queues may have a 1:1 correlation. Alternatively, the submission queues and completion queues do not have a 1:1 correlation.

In practice, at the initialization phase, the host device 300 creates one or more submission queues and one or more corresponding completion queues. In particular, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 may be based on a ring buffer, with a head pointer and a tail pointer. After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer, the memory device may monitor a communication interface between the host device 300 and the memory device for particular communications, such as writing to the submission queue(s) resident on the memory device. For example, the memory device can monitor the transport layer packets (TLPs) on the PCI Express bus, to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host queue one or more commands in this specific submission queue 304 (e.g., 4 commands as illustrated in FIG. 3). The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s).

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device or in the controller memory buffer in the memory device). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb).

As discussed above, the memory device is aware of the tail pointer, having been notified via step 2. Thus, the memory device can obtain all of the new commands from the submission queue 304. In NVMe, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device causes the data to be stored on the host device based on information in the command (e.g., the PRP 1 discussed below). As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCI Express TLPs to transfer the data from the memory device to the host device 300. Typically, the transferred data is stored in the host memory 302 of the host device 300 based on an indication in the command (e.g., the command includes an address to store the requested data.

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). As discussed in more detail below, the memory device may coalesce the interrupts based on one or more factors.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306. When the Host issues completion queue doorbell write, the parameters of the relevant interrupt coalescing vector may be updated to reflect this change. For instance, the status of the completion queue may be changed from an almost full state to an almost empty state. As a result, an interrupt may be flushed to the host device.

Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
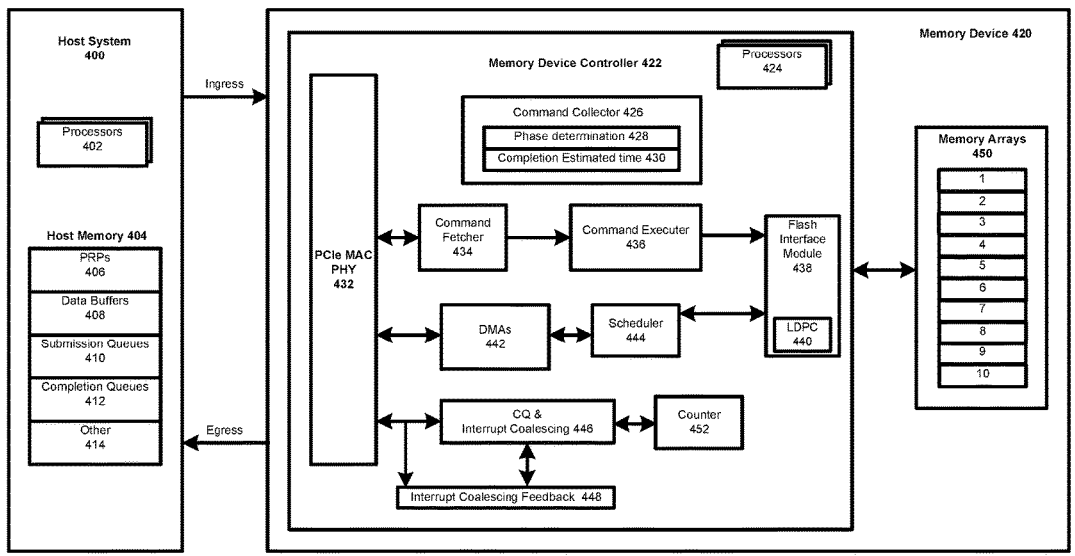
FIG. 4 is a block diagram of other exemplary components of a host system and a memory device.

FIG. 4 is a block diagram of other exemplary components of a host system 400 and a memory device 420. The host system 400 includes one or more processors 402 and host memory 404. Host memory 404 may comprise Physical Region Pages (PRPs) 406, data buffers 408, one or more submission queues 410, one or more completion queues 412, and other memory 414.

FIG. 4 further illustrates a communication interface between the host device 400 and the memory device 420. In a first implementation (not illustrated in FIG. 4), the communication interface between the host device and the memory device is simplex, with communications to and communications from the memory device on the same path. In a second implementation (illustrated in FIG. 4), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory in the host device 400.

In practice using NVMe, there may be a series of read requests (a request by the host device to read a data resident on the memory device, and vice-versa) and a series of write requests (a request by the host device to write data to a location resident on the memory device, and vice-versa). In particular, in NVMe, the memory device and the host device communicate with one another using transaction layer packet (TLP) requests, such as TLP read requests to perform a read on the other device, or TLP write requests to perform a write on the other device. In one example (with the submission queue and the completion queue resident on the host device), responsive to a TLP write request (sent via the ingress path) by the host device to the doorbell register on the memory device (with the write to the doorbell register indicating that there is a command on the submission queue), the memory device uses a TLP read request (sent via the egress path) to fetch the write command from the submission queue (which is resident on the host device). Thus, the write command is a request for the memory device to write data to the non-volatile memory. The memory device then parses the write command for information, such as an indication of a PRP pointer (e.g., PRP1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the completion queue (indicating that the write command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

As another example (again with the submission queue and the completion queue resident on the host device), responsive to a TLP write request by the host to the doorbell register on the memory device (with the write to the doorbell register indicating that there is a command on the submission queue), the memory device uses a TLP read request to fetch the read command from the submission queue (which is resident on the host device). Thus, the read command is a request for the memory device to read data from the non-volatile memory and to send the read data to the host device. The memory device then reads the non-volatile memory (e.g., flash memory) to read the data. The memory device can perform a series of operations on the data, such as error correction, encryption/decryption, etc., with storage buffers interspersed between each of the serial operation. The memory device may then parse the read command for information, such as an indication of a PRP pointer (e.g., PRP1) to a PRP list. The PRP list is a series of information, such as pointers or addresses, that indicates the location in the host device to store the data that was read from non-volatile memory (and optionally error corrected, encrypted, etc.). The memory device uses a TLP read request to read data from the pointers or address in the PRP list. Thereafter, the memory device uses a TLP write request to write the data that was read from non-volatile memory. After writing the data to the host device, the memory device uses a TLP write request to write an entry to the completion queue (indicating that the read command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

Optionally, the completion queue and submission queue may be resident in the memory device, such as in the Controller Memory Buffer (CMB). In that instance, the host device may send a TLP write request (sent via the ingress path) to the memory device to write to the submission queue. Likewise, the memory device may send a TLP write request (sent via the egress path) to generate an interrupt to the host device.

The allocation of memory to the submission queues and completion queues in the host memory buffer may be physically located contiguously or non-contiguously. In the instance of non-contiguous NVMe submission queue and/or completion queue, a PRP list is provided to the memory device. The PRP list contains a list of pointers that describes the location of each physical section of the relevant queue, as discussed in more detail below. In practice, the PRP list is stored in the host device memory and is not modified during the entire life of the relevant queue. In addition, a pointer to the PRP list may be used to point to at least a part of the PRP list. Each of the PRP list and pointer to the PRP list may be included at PRPs 406.

Memory device 420 includes the memory device controller 422 and memory arrays 450. Memory array 450 may be segmented in various ways, such as in 10 sections as illustrated in FIG. 4. The memory device controller 422 may include one or more processors 424, and incorporate one or all of a PCIe MAC and PHY interface 432.

Command fetcher 434 is configured to fetch the commands from the submission queues 410 on the host system 400 and queue them internally to the memory device 420. Command executer 436 is configured to arbitrate and execute the commands that were fetched from the submission queues 410. Data transfer scheduler 444 is configured to schedule one or more types of data transfers. As one example, read data may arrive from different memory arrays in parallel. Data transfer scheduler 444 may arbitrate from amongst the different data transfers.

Direct Memory Access (DMA) 442 is configured to perform the actual data transfer between host system 400 and memory device 420. Flash interface module 438 is configured to control and access the memory arrays 450. In FIG. 4, Flash interface module 438 also includes the low-density parity-check (LDPC) 440 which is a linear error correcting code. Other methods for error correction are contemplated.

Command collector 426 may analyze the commands currently being processed by memory device 420. In one implementation, the command collector 426 may determine the phase of the commands, using phase determination 428, currently being processed. Further, the command collector 426 may determine, using completion estimated time 430, an estimated time of completion of one or more of the commands currently being processed by the memory device 420.

Counter 452 is configured to count the number of entries that the memory device has placed in the completion queue. As discussed in more detail below, the number, as reflected by the counter 452, may be used to determine when to send an interrupt to the host device notifying of the entries on the completion queue. Further, the number of the counter 452 may be adjusted due to host latency in responding to the interrupt. For example, the memory device may include a threshold of 5 entries prior to sending an interrupt to the host device. In practice, the memory device uses the counter 452 to count the number of entries placed on the completion queue. When the number of the counter 452 equals 5, the memory device: (i) sends an interrupt to the host device notifying the host device of entries on the completion queue; and (ii) zeros out the counter 452 so that the number of the counter equals 0. While the host device is servicing the interrupt, the memory device may place additional entries on the completion queue (such as 2 additional entries), and increments the counter (so that the counter equals 2). After the host device notifies the memory device that the entries on the completion queue have been serviced, the memory device may determine that 7 entries on the completion queue have been reviewed by the host device. In this regard, the memory device may decrement the counter (from 2 to 0) reflecting the entries that the host device has processed during the host latency in servicing the interrupt.

Completion Queue (CQ) and Interrupt Coalescing 446 is configured to perform one or more of the following: completion queue and interrupt posting; and interrupt coalescing. Interrupt coalescing feedback 448 is configured to monitor the issued interrupts and the host system 400 responses. Based on the feedback, interrupt coalescing feedback 448 may adjust or fine-tune the interrupt coalescing thresholds and parameters, as discussed in more detail below.

The coalescing methodology may depend on a variety of factors. In one implementation, the coalescing methodology may be strictly related to the current status of the relevant completion queue. More specifically, assuming that a specific completion queue is empty or almost empty, the memory device may assume that the processor(s) 402 on host system 400 is not busy. In this instance, the memory device may post the interrupt immediately. On the other hand, when the completion queue is full or almost full, the memory device may assume that the processor(s) 402 is busy. In this instance, to reduce the burden on the processor(s) 402 in the host system 400, the memory device 420 may coalesce the interrupts. When the completion queue is neither almost empty nor almost full, the processor(s) 402 may not be overloaded and may not be in idle state. In this case, the memory device may partially coalesce the interrupts based on other parameters, as discussed in more detail below. Alternatively or in addition, CQ and Interrupt Coalescing 446 may use the estimated time for completion of the commands using completion estimated time 430 in order to determine whether and/or how to coalesce interrupts, as discussed in more detail below.

Figure 5:
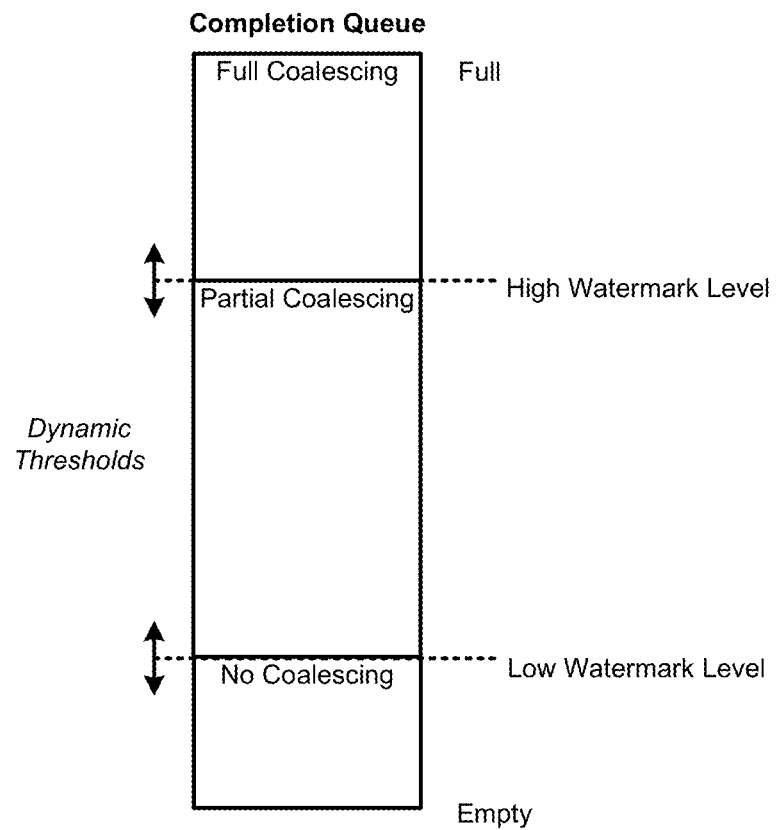
FIG. 5 is a block diagram illustrating the completion queue and interrupt coalescing.

FIG. 5 is a block diagram illustrating the completion queue and interrupt coalescing. In particular, FIG. 5 illustrates the relation between a completion queue and the interrupt coalescing algorithm. For each completion queue, one or more watermark levels may be defined. A watermark level may comprise a number of commands in a particular phase or processing, such as a number of commands that have completed processing and/or have had an entry posted to the completion queue indicative that the processing of the command has completed. As discussed above, the memory device may send an interrupt after an entry has been posted to the completion queue. In one implementation, illustrated in FIG. 5, two watermark levels are defined as being different levels of fullness. The low watermark level may represent the almost empty condition (indicative that the processor on the host has additional capacity) while the high watermark level represents the almost full condition (indicative that the processor on the host may be at or over capacity). In this regard, the low watermark level has a number that is less than the high watermark level. Though two watermark levels are illustrated, one watermark level or three or more watermark levels are contemplated.

One or more of the watermark levels (such as one or both of the high watermark level and the low watermark level illustrated in FIG. 5) may be dynamically adapted or changed based on one or more factors. As one example, the watermark level(s) may be modified based on host latency. In particular, the high watermark level and the low watermark level may be modified based on the previous interrupts that were posted to the host system 400 and reactions of the host system 400 to the postings (e.g., how long did the host system 400 take to process the interrupt). As another example, one or more watermark levels may be modified based on the priority of the commands in the completion queue. As discussed above, the memory device may immediately post an interrupt in response to determining a high priority command in the completion queue. Alternatively, the memory device may modify the watermarks as illustrated in FIG. 5 based on the priority of the commands in the completion queue.

In practice, when the current level of associated completion queue is below the low watermark level, the interrupt may be posted immediately since it is assumed that the host system 400 is not busy. This methodology also resolves low queue depth issue. In low queue depth, the level of a completion queue is below the low watermark level and therefore the interrupt is not coalesced. When the current level of associated completion queue is above the high watermark level, the interrupts may be fully coalesced based on one or more factors (e.g., the host configured TIME and THR parameters). Otherwise, the interrupts may partially coalesced (e.g., based on current outstanding commands, there might be an interrupt coalescing but having lower TIME and THR values). Thus, interrupts may be partially coalesced such that under certain circumstances interrupts are coalesced and under other circumstances interrupts are not coalesced.

FIG. 5 illustrates a single partial coalescing zone. In an alternative implementation, the partial coalescing zone in the completion queue may be split into several zones while having different rules for each one of them. As one example, the partial coalescing zone may be segmented into three zones, with the first zone coalescing the interrupt only when estimating that a command is going to be completed very soon (e.g., within a predetermined number of hardware cycles, such as the read data was already transferred from the flash memory and is in the error correction phase). The second zone may coalesce the interrupt if there is a pending command associated with the same completion queue, even if the data was not fetched from the flash memory but is scheduled to do so. The third zone may coalesce the interrupt if there is any pending command associated with the same completion queue even though it is deeply queued in the memory device waiting for a service. In one implementation, the partial coalescing algorithm is limited by the host device configured TIME and THR parameters. In an alternate implementation, the partial coalescing algorithm is not limited by the host device configured TIME and THR parameters.

Figure 6:
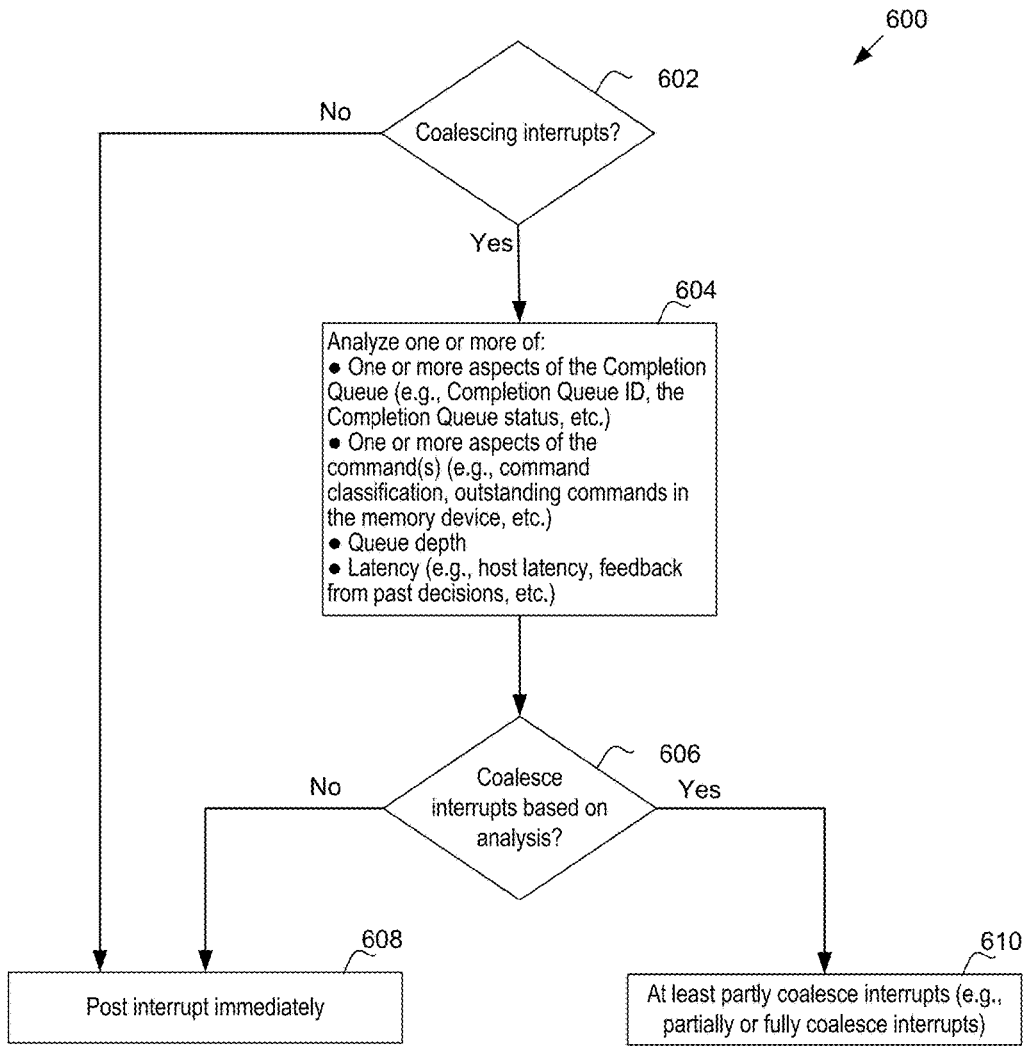
FIG. 6 is a flow chart of a first example method of interrupt coalescing.

FIG. 6 is a flow chart 600 of a first example method of interrupt coalescing. At 602, the memory device determines whether interrupts are coalesced. If not, at 608, the interrupt is posted immediately. If so, one or more aspects are analyzed, such as: one or more aspects of the completion queue (e.g., Completion Queue ID, the Completion Queue status, etc.); one or more aspects of the command(s) (e.g., command classification, outstanding commands in the memory device, etc.); the queue depth; and latency (e.g., host latency, feedback from past decisions, etc.). At 606, the memory device determines whether to coalesce the interrupts based on the analysis. If so, at 610, the interrupts are at least partly coalesced (e.g., partially or fully coalescing the interrupts). If not, at 608, the interrupt is posted immediately.

Figure 7:
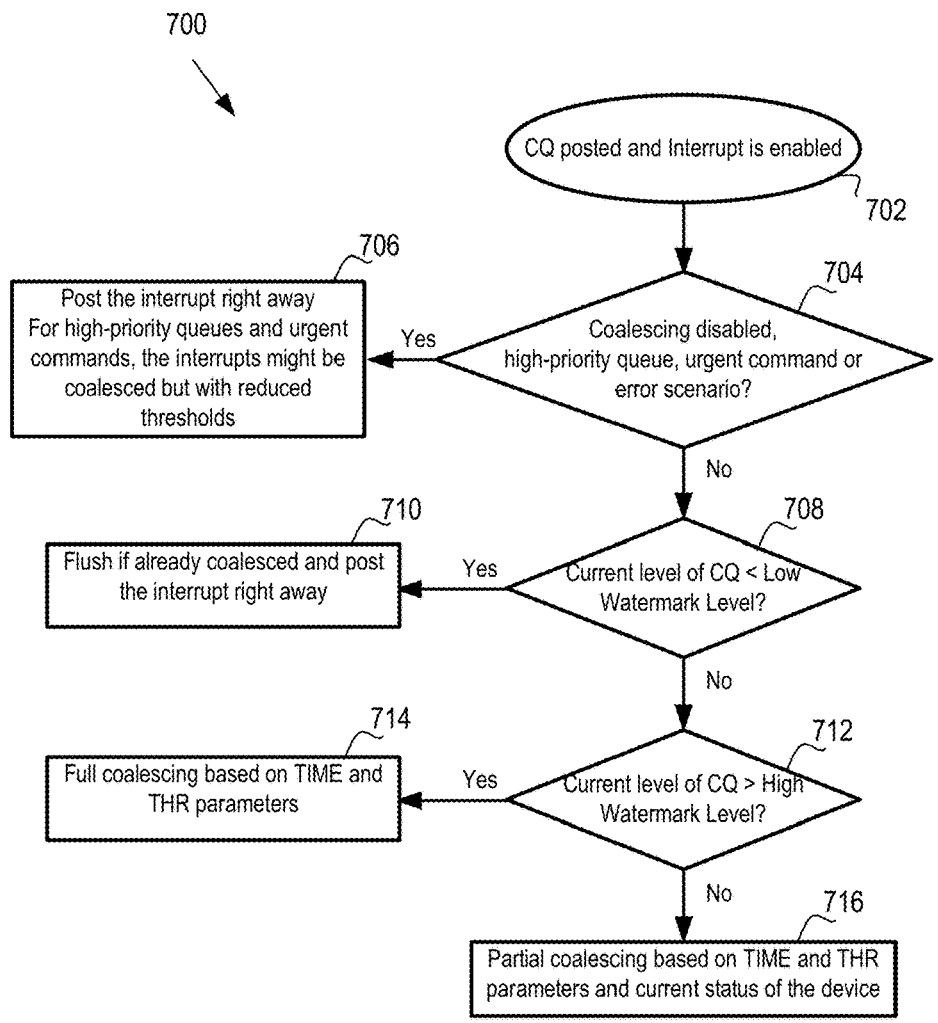
FIG. 7 is a flow chart of a second example method of interrupt coalescing.

FIG. 7 is a flow chart 700 of a second example method of interrupt coalescing. In particular, FIG. 7 implements the dynamic interrupt coalescing algorithm. At 702, the entry to the completion queue is posted and the interrupt is enabled. In one implementation, at 704, an interrupt may be coalesced under certain circumstances including: the coalescing feature is enabled; the relevant completion queue is not designated as a high priority queue; the command is deemed non-urgent; and the command is completed normally. If yes, at 706, the interrupt is posted immediately. Alternatively, coalescing may be performed for entries to high priority queues; however, the coalescing methodology (such as the watermark levels) may differ than the coalescing methodology for lower priority queues. As discussed above, the memory device may determine whether a queue, such as a completion queue, is considered a high priority queue.

Examples of high priority queues include a queue designated as an Admin queue and an I/O queue which is defined by a Host to be a high priority queue. When an entry is associated with a high priority queue, in one implementation, the memory device posts the interrupts immediately, thus ignoring the interrupt coalescing logic.

If not, at 708, the memory device determines whether the current level of associated completion queue is below the low watermark level. If so, at 710, the memory device flushes if already coalesced and posts the interrupt immediately. Otherwise, at 712, the memory device determines whether the current level of associated completion queue is above the high watermark level. If so, at 714, the memory device fully coalesces the interrupts based on the Host configured TIME and THR parameters. If not, at 716, the interrupts are partially coalesced, such as based on the TIME and THR parameters and the current status of the memory device (e.g., based on current outstanding commands, there may be an interrupt coalescing with lower TIME and THR values).

Figure 8:
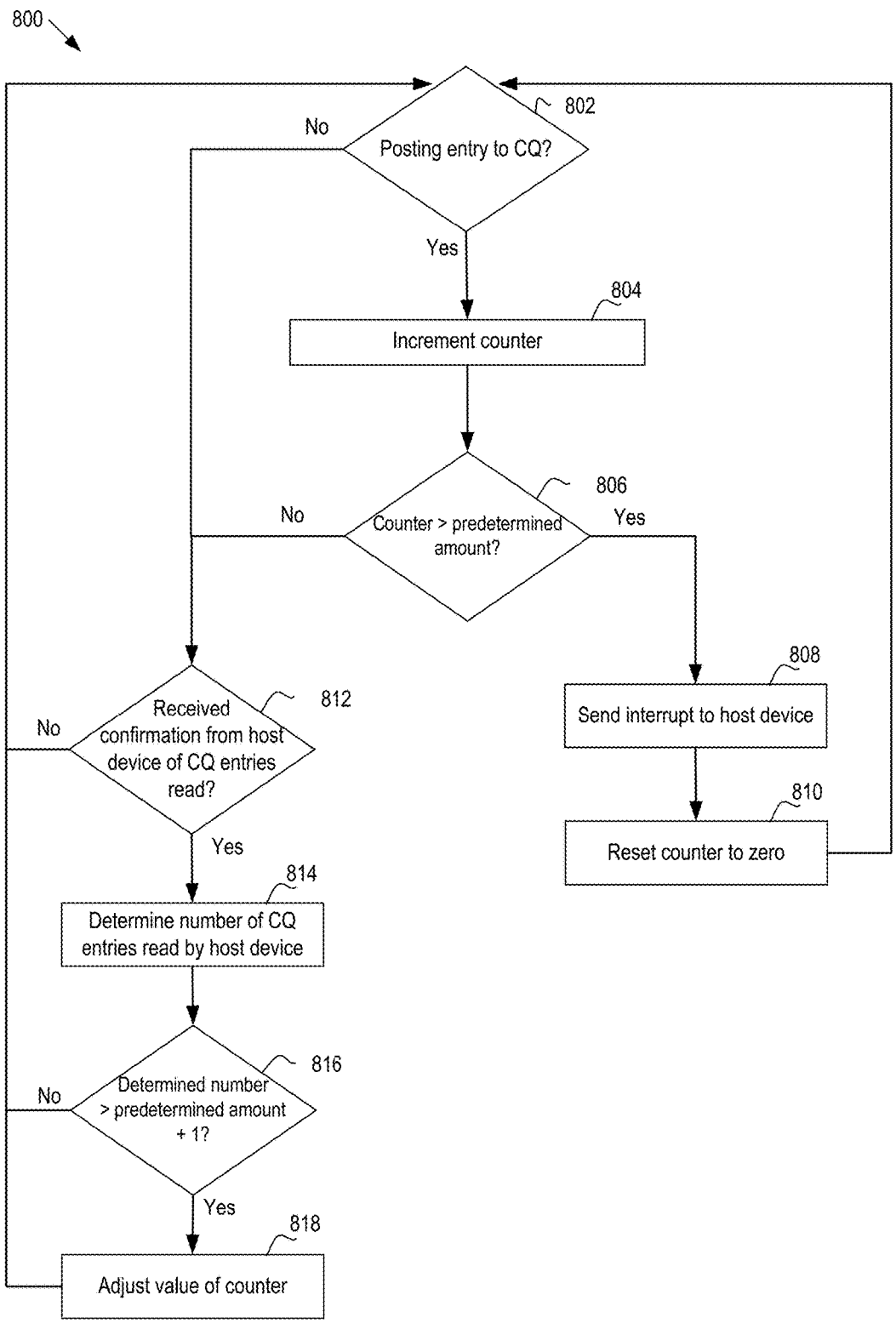
FIG. 8 is a flow chart of an example method of using a counter for interrupt coalescing.

FIG. 8 is a flow chart 800 of an example method of using a counter for interrupt coalescing. At 802, the memory device determines whether an entry has been posted to a completion queue. If so, at 804, the counter is incremented. Thereafter, at 806, the value of the counter is compared to a predetermined amount. If the value of the counter is greater than the predetermined amount, at 808, the interrupt is sent to the host device notifying of entries to the completion queue, and at 810, the value of the counter is reset to zero.

Otherwise, at 812, the memory device determines whether it has received confirmation from the host device that entries on the completion queue have been reviewed (e.g., step 8 in FIG. 3). If no, the flow chart 800 loops back to 802. If so, at 814, the memory device determines the number of completion queue entries that were reviewed by the host device. Further, at 816, the memory device determines if the number determined at 814 is greater than the predetermined amount+1. If so, this indicates that the host device has reviewed entries placed in the completion queue after the counter was reset at 810. In order to avoid prematurely sending an interrupt, the value of the counter is adjusted at 818 to reflect the number of entries that are currently in the completion queue that have not been reviewed by the host device.

Figure 9:
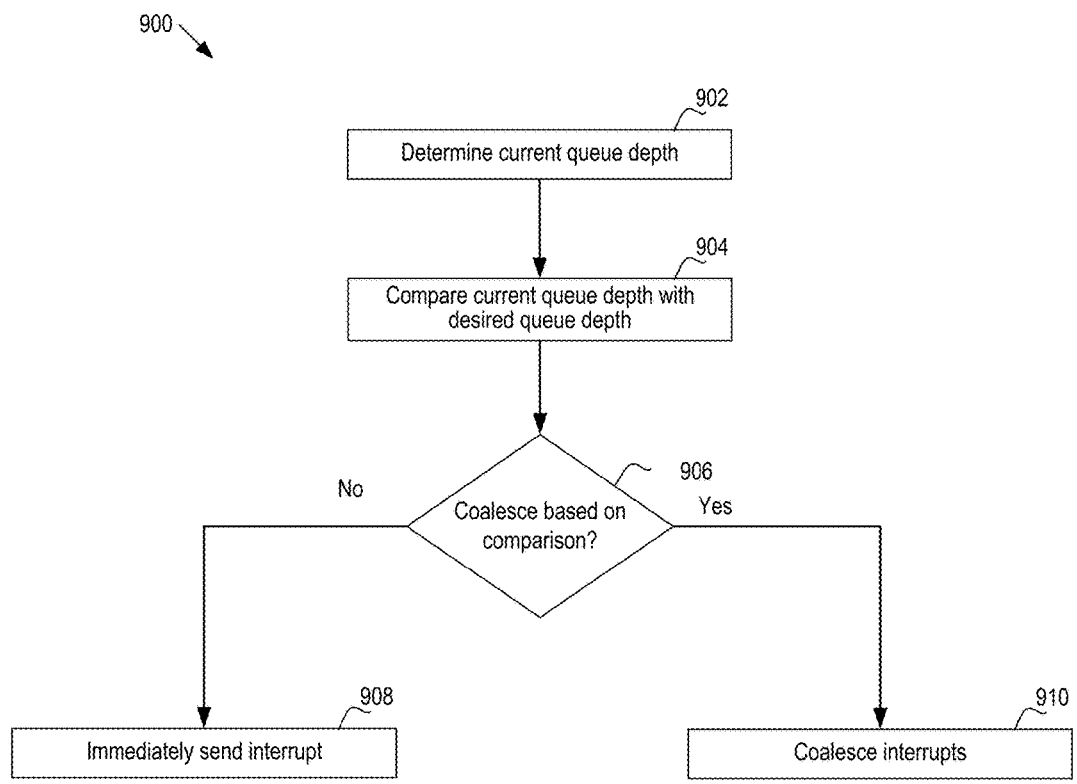
FIG. 9 is a flow chart of an example method of analyzing queue depth for interrupt coalescing.

FIG. 9 is a flow chart 900 of an example method of analyzing queue depth for interrupt coalescing. As discussed above, commands undergo several phases. The queue depth may be measured in one of several ways. In one way, the queue depth may be measured by the number of commands that are currently in phases under operational control of the memory device. For example, the memory device may control phases 3-6 in FIG. 3 by performing various operations. Thus, one measure of queue depth is the number of commands that the memory device has fetched but has not notified, via interrupt, at being placed on the completion queue. At 902, the memory device determines the current queue depth (such as the current number of commands in phases 3-6 of FIG. 3). At 904, the memory device compares the current queue depth with the desired queue depth. In one implementation, the memory device may have a desired queue depth. The desired queue depth may be predetermined and static, or may be dynamic based on the current status of the memory device and/or of the host device. In one example, the desired queue depth is equal to 1, meaning that the memory device processes a single command (such as from phases 3-6) at a time.

At 906, the memory device determines whether to coalesce the interrupts based on the comparison at 904. For example, the current queue depth may be less than the desired queue depth, leading the memory device to determine that the more commands may be within phases 3-6. Thus, at 910, the memory device coalesces interrupts. Alternatively, the memory device may determine that the current queue depth is greater than or equal to the desired queue depth, leading the memory device at 908 to immediately send the interrupt to the host device.

Figure 10:
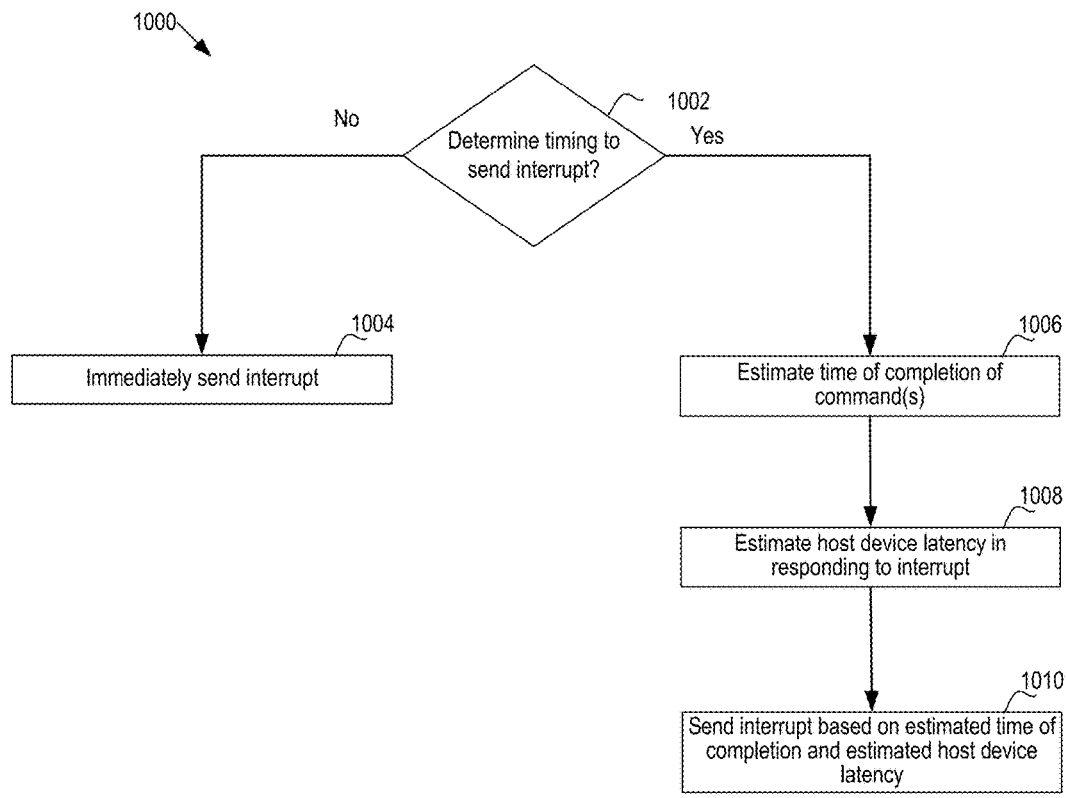
FIG. 10 is a flow chart of an example method of estimating time of command completion and host latency for interrupt coalescing.

FIG. 10 is a flow chart 1000 of an example method of estimating time of command completion and host latency for interrupt coalescing. In one implementation, the memory device may estimate operations on the memory device in determining when to send the interrupt to the host device. In another implementation, the memory device may estimate operations on the host device in determining when to send the interrupt to the host device. For example, the memory device may determine, based on host latency, when to transmit the interrupt so that the host device reviews a predetermined number of entries on the completion queue (e.g., 10 entries on the completion queue). The memory device may post the interrupt before all of the predetermined number of entries are written to the completion queue so that, by the time the host device services the interrupt, all of the predetermined number of entries are written to the completion queue (e.g., the interrupt is posted prior to the $10^{th}$ entry is written to the completion queue with enough time so that due to host latency, the memory device writes the $10^{th}$ entry by the time the host device services the interrupt). In still another implementation (illustrated in FIG. 10), the memory device may estimate operations on both the memory device and the host device in determining when to send the interrupt to the host device. At 1002, the memory device determines whether to factor in timing when sending the interrupt. If not, at 1004, the memory device sends the interrupt immediately. If so, at 1006, the memory device may estimate the time of completion, by the memory device, of operations on command(s). For example, the memory device may analyze commands that are in step 4 of FIG. 3 (processing the command) in order to determine whether the estimated time of completion of step 4 is within a predetermined period.

At 1008, the memory device may likewise estimate host device latency in responding to the interrupt. As part of the estimate for operations on the host device, the memory device may compile statistics and project/emulate the host completion queue processing speed. In one implementation, the memory device may use a hardware engine that configured to estimate the host side completion queue depth at any given time. In this regard, the memory device may factor the host side completion queue depth in the interrupt timing methodology, in addition to the actual indications transmitted from the host device. The output of the hardware engine may be considered as the "current level of CQ" and may be used in FIG. 10 or at 708 in FIG. 7. At 1010, the memory device may send the interrupt based on the estimated time of completion at 1006 and the estimated host device latency at 1008.

As one example, the memory device may estimate that in a predetermined time in the future (such as in a few HW cycles of the memory device), the memory device will post another completion to the same completion queue. In this case, the memory device may post the interrupt after posting the second completion entry, thereby saving the posting of one interrupt message to the host. The memory device may also take into account the host device latency (including PCIe turnaround time) and send the interrupt to the host device right before the posting of the second completion queue entry. Thus, the memory device may time the interrupt such that the second completion entry is on the completion queue when the host device fetches the entries.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
performing the following in a storage system in communication with a host device:
analyzing fullness of a completion queue by comparing a level of fullness of the completion queue to at least two levels;
in response to determining that the level of fullness is at or below a first level, generating an interrupt to the host device, the interrupt indicative to the host device that processing of one or more commands on the completion queue is completed;
in response to determining that the level of fullness is at or above a second level, waiting to generate the interrupt to the host device; and
in response to determining that the level of fullness is between the first level and the second level, partially coalescing the interrupt to the host device.

2. The method of claim 1, further comprising:
determining whether to coalesce notification of completion of a first command with notification of completion of a second command; and
in response to determining not to coalesce immediately sending the interrupt to the host device.

3. The method of claim 1, further comprising:
analyzing an identification associated with the completion queue, wherein the identification associated with the completion queue is indicative of a priority of the completion queue; and
determining, based on the priority of the completion queue, whether when to generate the interrupt to the host device.

4. The method of claim 3, wherein:
the identification associated with the completion queue comprises an associated identification with a submission queue; and
wherein the priority of the completion queue comprises a priority of the submission queue.

5. The method of claim 1, wherein the two levels are predetermined.

6. The method of claim 1, wherein the two levels are dynamically determined.

7. The method of claim 1, further comprising:
determining a type of command; and
determining, based on the type of command, whether to coalesce the interrupt with another interrupt or to send the interrupt immediately.

8. The method of claim 1, further comprising:
determining outstanding commands subject to execution in the storage system; and
determining, based on the outstanding commands subject to execution, whether to coalesce the interrupt with another interrupt or to send the interrupt immediately.

9. A memory system device comprising:
a memory;
and
a controller in communication with the memory, the controller configured to:
analyze fullness of a completion queue by comparing a level of fullness of the completion queue to at least two levels;
in response to determining that the level of fullness is at or below a first level, generate a notification to the host device;
in response to determining that the level of fullness is at or above a second level, wait to generate the notification to the host device; and
in response to determining that the level of fullness is between the first level and the second level, partially coalesce the notification to the host device.

10. The memory system of claim 9, wherein the controller is further configured to:
estimate a host latency, the host latency indicative of a time period for the host device to respond to the notification; and
time sending the notification based on both the estimated completion and the host latency.

11. The memory system of claim 10, wherein the controller is further configured to estimate the host latency based on responses of the host device to previous notifications.

12. The memory system of claim 9, wherein the controller is further configured to
determine not to coalesce the notification to the host device; and
in response to determining not to coalesce the notification to the host device, send the notification immediately to the host device.

13. A memory system comprising:
a memory;
means for analyzing fullness of a completion queue by comparing a level of fullness of the completion queue to at least two levels;
means for generating an interrupt to the host device, in response to determining that the level of fullness is at or below a first level, the interrupt indicative to the host device that processing of one or more commands on the completion queue is completed;
means for waiting to generate the interrupt to the host device, in response to determining that the level of fullness is at or above a second level; and
means for partially coalescing the interrupt to the host device, in response to determining that the level of fullness is between the first level and the second level.

14. The memory system of claim 13, further comprising means for dynamically determining one or both of the first level and the second level.

15. The memory system of claim 14, wherein the means for dynamically f determining one or both of the first level and the second level is based on host latency, the host latency indicative of a time period for the host device to respond to the interrupt.

16. The memory system of claim 14, wherein the means for dynamically determining one or both of the first level and the second level is based on priority of command entries in the completion queue.

17. The memory system of claim 13, further comprising means for determining to partially coalesce based on an estimated time of completion of processing of one or more commands.

* * * * *